H. A. ADAMS.
HARVESTER REEL.

No. 191,217. Patented May 29, 1877.

Witnesses:
Heinrich F. Emns
L. M. Harris

Henry A. Adams,
Inventor.

By Coburn & Thacher
Attys.

UNITED STATES PATENT OFFICE.

HENRY A. ADAMS, OF SANDWICH, ILLINOIS.

IMPROVEMENT IN HARVESTER-REELS.

Specification forming part of Letters Patent No. 191,217, dated May 29, 1877; application filed April 14, 1877.

*To all whom it may concern:*

Be it known that I, HENRY A. ADAMS, of Sandwich, in the county of De Kalb and State of Illinois, have invented a new and useful Improvement in Harvester-Reels, which is fully described in the following specification, reference being had to the accompanying drawings, in which—

Figure 1:
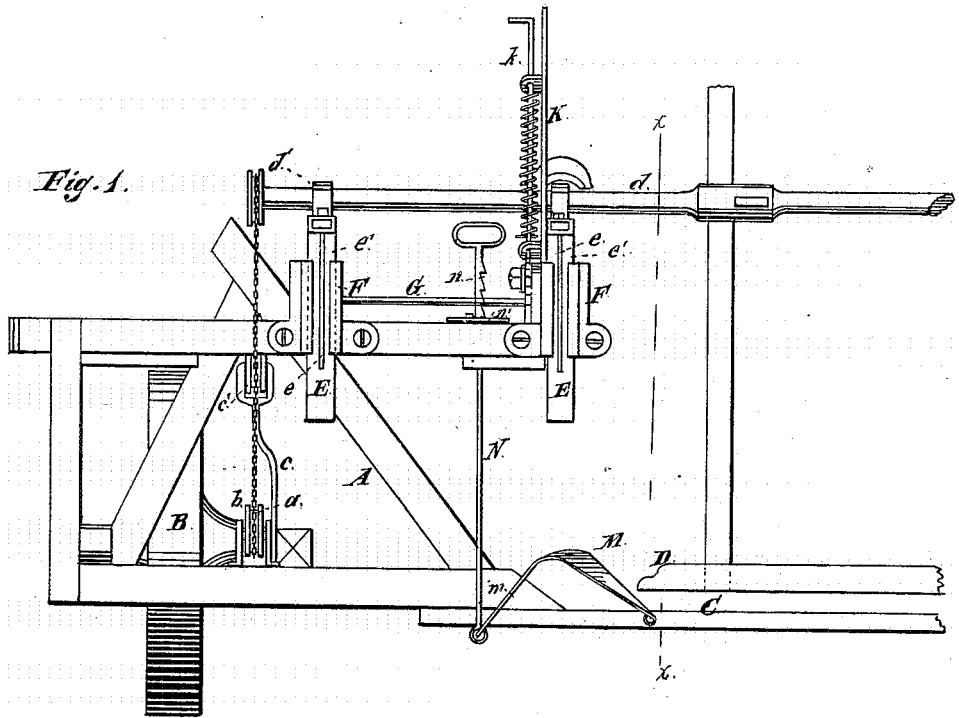
Figure 2:
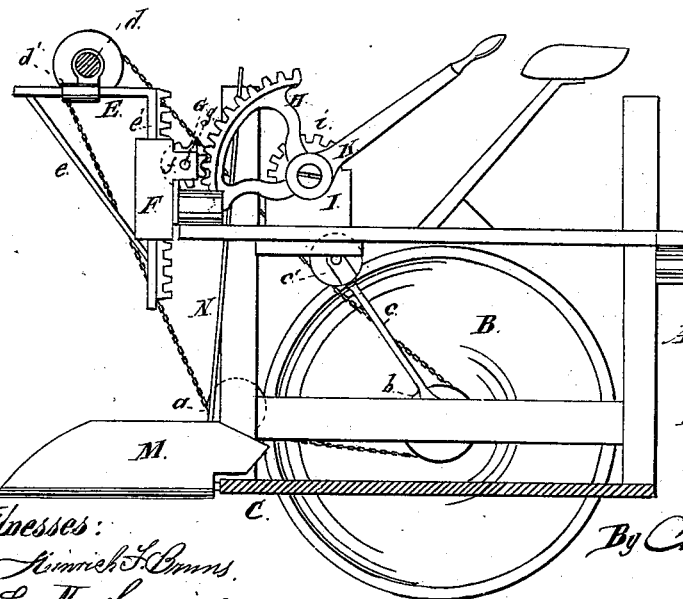

Figure 1 represents a front elevation of a harvester with my improvement attached; and Fig. 2 a sectional view of the same, taken on the line $x$ $x$, Fig. 1.

My invention relates to that class of harvesters in which the reel is adjustable vertically at the pleasure of the driver.

The invention consists in supporting the reel-shaft upon brackets, the vertical arms of which are toothed and engage with pinions, by means of which the brackets are raised and lowered in suitable guides. It also consists in pivoting the inner divide or grain-guard to the platform, and attaching thereto devices, by means of which the guard may be adjusted by the driver independently of the adjustment of the reel.

In the drawings, A represents the upright frame-work of a harvester; B, the supporting and driving wheel; C, the grain-platform, and D the reel. The reel-shaft $d$ is mounted upon brackets E, which are right-angled in form, and are strengthened by a brace-rod, $e$, connecting the two arms of the bracket. One arm, $e'$, of each bracket is provided with a toothed rack, and is movable up and down in vertical guides F, which are rigidly attached to the main frame of the machine. Just behind the brackets is placed a shaft, G, which has its bearings in lugs $f$ upon the guides F, and carries two pinions, $g$, which engage with the toothed racks on the brackets, openings being mode in the back plates of the guides to permit the pinions to be placed in contact with the racks. A toothed segment, H, is pivoted to a standard, I, upon the main frame of the machine. This segment is arranged so as to engage with one of the pinions $g$, and a hand-lever, K, is rigidly connected with it, so that by moving the lever back and forth the segmental rack is vibrated, thereby rotating the pinions $g$, which, in turn, raise or lower the brackets E by means of the racks attached thereto, and so adjust the height of the reel-shaft and reel. The standard I is provided with a notched segment, $i$, and the lever K has a spring-catch lever, $k$, upon it, which engages with the notches $i$, and so holds the reel at any height to which it may be adjusted. The lever K is within reach of the driver sitting upon the seat L, and therefore the vertical adjustment of the reel is under his control. The bearings $d'$ of the reel-shaft slide upon the horizontal arms of the supporting-brackets, so that the reel may be adjusted horizontally by moving these bearings back and forth, and may be fixed at any point by pins, which pass through holes in the bearings into any one of a series of holes into corresponding holes in the arms of the brackets.

The inner divider or grain-guard M is pivoted to the platform, and is constructed with a projecting arm, $m$, to the outer end of which the lower end of a rod, N, is attached. This rod extends upward through a suitable guide on the upper part of the main frame, and is brought within reach of the driver so that he can adjust the position of the divider M at pleasure. It will be seen that this adjustment is made independently of the vertical adjustment of the reel or any other portion of the machine. The upper end of the rod N may be notched, as seen at $n$, and a catch, $n'$, pivoted to the main frame to engage with the notches $n$, for the purpose of holding the divider in any desired position. This device may be modified in construction, however, as any suitable holding mechanism will answer the purpose; and, if desired, a lever may be attached between the notched or forked upper end of the rod N, by which to raise and lower the latter. The reel-shaft is driven by a cord or chain, which passes around a pulley or sprocket-wheel, $b$, on the axle of the main wheel, a similar pulley or wheel, $a$, on the main frame, and a third on the inner end of the reel-shaft. An arm, $c$, is hinged or pivoted to the main axle so as to swing freely thereon, and upon its outer end is journaled a pulley or sprocket wheel, $c'$. This arm extends forward from the axle, and the pulley upon its outer end rests upon the upper side of the reel-driving cord or chain, the arm being weighted sufficiently to keep the drive-chain taut, whatever may be the position of the reel-shaft, but at the same time permiting the adjustment of the latter by reason of the free motion of the arm about its pivotal connection.

Having thus described my invention, what I claim as new, and desire to secure by Letters Patent, is—

1. The right-angled adjustable brackets E, provided with racks, as described, in combination with the reel-shaft $b$ mounted thereon, pinions $g$, and shaft G, supported in fixed bearings on the machine, substantially as and for the purpose set forth.

2. The combination of the reel-shaft $d$, brackets E, provided with racks, pinions $g$ on the shaft G, segmental rack H, and lever K, substantially as described.

3. A pivoted divider or grain-guard, M, adjustable at the pleasure of the driver, independently of the adjustment of the reel, substantially as described.

4. The combination of the pivoted guard or divider M, rod N, notched at its upper end, and catch $n'$, substantially as described.

HENRY A. ADAMS.

Witnesses:
S. B. STINSON,
J. P. ADAMS.